US011150951B2

(12) United States Patent
Li et al.

(10) Patent No.: US 11,150,951 B2
(45) Date of Patent: Oct. 19, 2021

(54) RELEASABLE RESOURCE BASED PREEMPTIVE SCHEDULING

(71) Applicant: International Business Machines Corporation, Armonk, NY (US)

(72) Inventors: Xiu Qiao Li, Beijing (CN); Zhaohui Ding, Beijing (CN); Xun Pan, Xian (CN); Rong Song Shen, Beijing (CN); Michael Spriggs, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 16/195,989

(22) Filed: Nov. 20, 2018

(65) Prior Publication Data

US 2020/0159587 A1    May 21, 2020

(51) Int. Cl.
*G06F 9/50* (2006.01)

(52) U.S. Cl.
CPC .................. *G06F 9/5027* (2013.01)

(58) Field of Classification Search
CPC .................................................. G06F 9/5027
USPC ...................................................... 718/1–108
See application file for complete search history.

(56) References Cited

U.S. PATENT DOCUMENTS

| | | | |
|---|---|---|---|
| 7,743,378 B1 | 6/2010 | Markov | |
| 8,458,712 B2* | 6/2013 | Chan | G06F 9/4881 718/103 |
| 9,507,631 B2* | 11/2016 | Chen | G06F 9/4856 |
| 2004/0019679 A1* | 1/2004 | E | H04L 67/02 709/226 |
| 2014/0075222 A1* | 3/2014 | Jackson | G06F 1/3234 713/320 |
| 2015/0154047 A1* | 6/2015 | Chen | G06F 9/5083 718/103 |
| 2017/0357531 A1* | 12/2017 | Zhang | G06F 9/5005 |

OTHER PUBLICATIONS

Marinho, José, and Stefan M. Petters. "Job phasing aware preemption deferral." 2011 IFIP 9th International Conference on Embedded and Ubiquitous Computing. IEEE, 2011.pp.128-135 (Year: 2011).*
Yu, Chao, Leihua Qin, and Jingli Zhou. "A multicore periodical preemption virtual machine scheduling scheme to improve the performance of computational tasks." The Journal of Supercomputing 67.1 (2014): pp. 254-276. (Year: 2014).*
Sajjapongse, Kittisak, Xiang Wang, and Michela Becchi. "A preemption-based runtime to efficiently schedule multi-process applications on heterogeneous clusters with gpus." Proceedings of the 22nd international symposium on High-performance parallel and distributed computing. 2013.pp.179-190 (Year: 2013).*
X. Qin, H. Jiang, Y. Zhu and D. R. Swanson, "Boosting performance of I/O-intensive workload by preemptive job migrations in a cluster system," Proceedings. 15th Symposium on Computer Architecture and High Performance Computing, Sao Paulo, Brazil, 2003, pp. 235-243. (Year: 2003).*

(Continued)

*Primary Examiner* — Satish Rampuria
(74) *Attorney, Agent, or Firm* — Nathan M. Rau

(57) ABSTRACT

A computer-implemented method, a computer system and a computer program product for releasable resource-based preemptive scheduling. One or more currently running workloads are determined to be preempted by a pending workload. Releasable resources from the one or more currently running workloads meet required resources of the pending workload. The pending workload is dispatched so that it uses at least part of the releasable resources from the one or more currently running workloads to run.

11 Claims, 7 Drawing Sheets

(56) References Cited

OTHER PUBLICATIONS

Deng, Zhong, and Jw-S. Liu. "Scheduling real-time applications in an open environment." Proceedings Real-Time Systems Symposium. IEEE, 1997.pp.308-319 (Year: 1997).*

Phillips, Cynthia A., et al. "Optimal time-critical scheduling via resource augmentation." Proceedings of the twenty-ninth annual ACM symposium on Theory of computing. 1997.pp. 140-149 (Year: 1997).*

Easwaran, Arvind, and Bjorn Andersson. "Resource sharing in global fixed-priority preemptive multiprocessor scheduling." 2009 30th IEEE Real-Time Systems Symposium. IEEE, 2009.pp.377-386 (Year: 2009).*

Jackson, Laura E., and George N. Rouskas. "Deterministic preemptive scheduling of real-time tasks." Computer 35.5 (2002): pp. 72-79. (Year: 2002).*

Stankovic, John A., et al. "Implications of classical scheduling results for real-time systems." Computer 28.6 (1995): pp. 16-25. (Year : 1995).*

Sha, Lui, et al. "Mode change protocols for priority-driven preemptive scheduling." Real-Time Systems 1.3 (1989): pp. 243-264. (Year: 1989).*

Thekkilakattil, A., "Limited Preemptive Scheduling in Real-Time Systems", Malardalen University Press Dissertations, No. 199, 2016, Sweden, 232 pages.

Li et al., "Improving Preemptive Scheduling with Application-Transparent Checkpointing in Shared Clusters", Proceedings of the 16th Annual Middleware Conference, Dec. 2015, pp. 222-234.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

IBM, "IBM Spectrum LSF Suites—Overview," https://www.ibm.com/us-en/marketplace/hpc-workload-management, printed Aug. 15, 2018, 1 pg.

* cited by examiner

RELEASABLE RESOURCE BASED PREEMPTIVE SCHEDULING

BACKGROUND

The present disclosure relates to workload scheduling, and more specifically, to preemptive scheduling based on releasable resource.

Preemption is a common and widely used mechanism in workload scheduling. In preemptive scheduling, a pending workload in a scheduling queue can take resources away from one or more workloads currently running on a host. A workload (also interchangeably referred to herein as a "job") represents a group of processes and/or tasks to be performed using resources provided on a host to accomplish a desired result and/or produce an output. Resources for a workload include, but are not limited to, computing capacities (e.g., CPU slots, computing cycles, computing engines, etc.), memory or storage units (e.g., memory, disk drive(s), storage devices, etc.), and data communication capacities (e.g., input/output (I/O) interfaces, networking interfaces, communication devices, etc.). As a result of preemptive scheduling, the pending workload may be dispatched to run on the host, while the one or more currently running workloads will be terminated or killed and placed back in the scheduling queue, or stopped or suspended until the resources preempted become available again.

Generally, preemption is implemented based on relative priorities of the workloads. Namely, a pending high-priority workload grabs the resources of a currently running workload of a lower priority. Relative priorities of scheduled workloads are designated by a scheduler responsible for workload distribution, commonly according to urgency or importance of the workloads. In some cases, criteria such as whether the workloads need to be carried out in real-time, dependency on the running environment, or time estimated for finishing the workloads are taken into consideration in the determination of workload priorities.

SUMMARY

Disclosed herein are embodiments of a computer-implemented method, a computer system and a computer program product for releasable resource-based preemptive scheduling.

According to one embodiment of the present disclosure, there is provided a computer-implemented method. One or more currently running workloads are determined to be preempted by a pending workload. Releasable resources from the one or more currently running workloads meet required resources of the pending workload. The pending workload is dispatched so that it uses at least part of the releasable resources from the one or more currently running workloads to run.

According to another embodiment of the present disclosure, there is provided a computer system. The computer system comprises a processor and a computer-readable memory coupled to the processor, the memory comprising instructions that when executed by the processor implement the method as provided according to embodiments of the present disclosure.

According to another embodiment of the present disclosure, there is provided a computer program product. The computer program product comprises a computer readable storage medium having program instructions embodied therewith, the program instructions executable by a processor to cause the processor to implement the method as provided according to embodiments of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
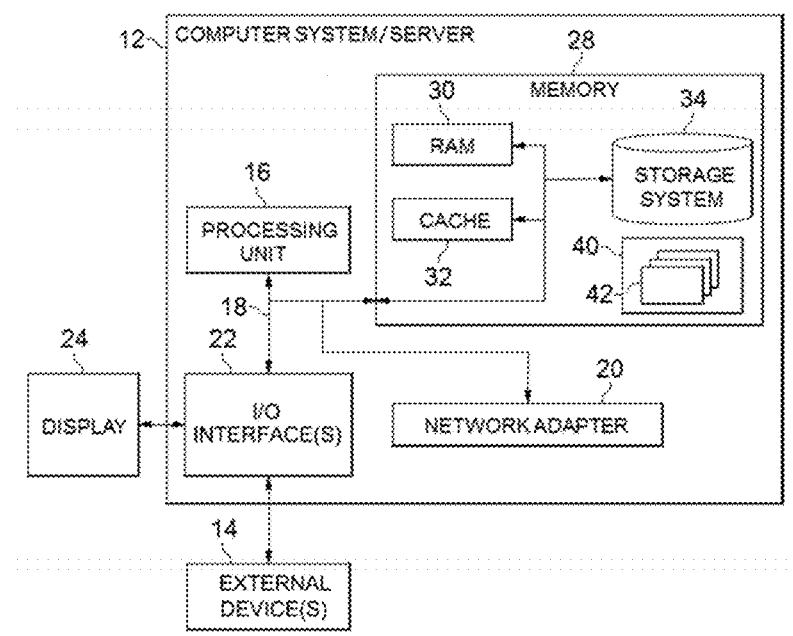
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
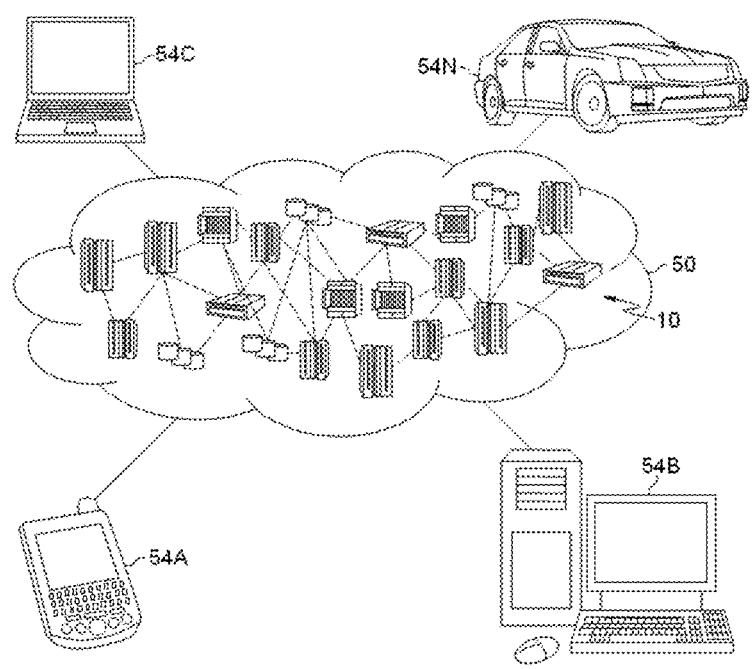
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
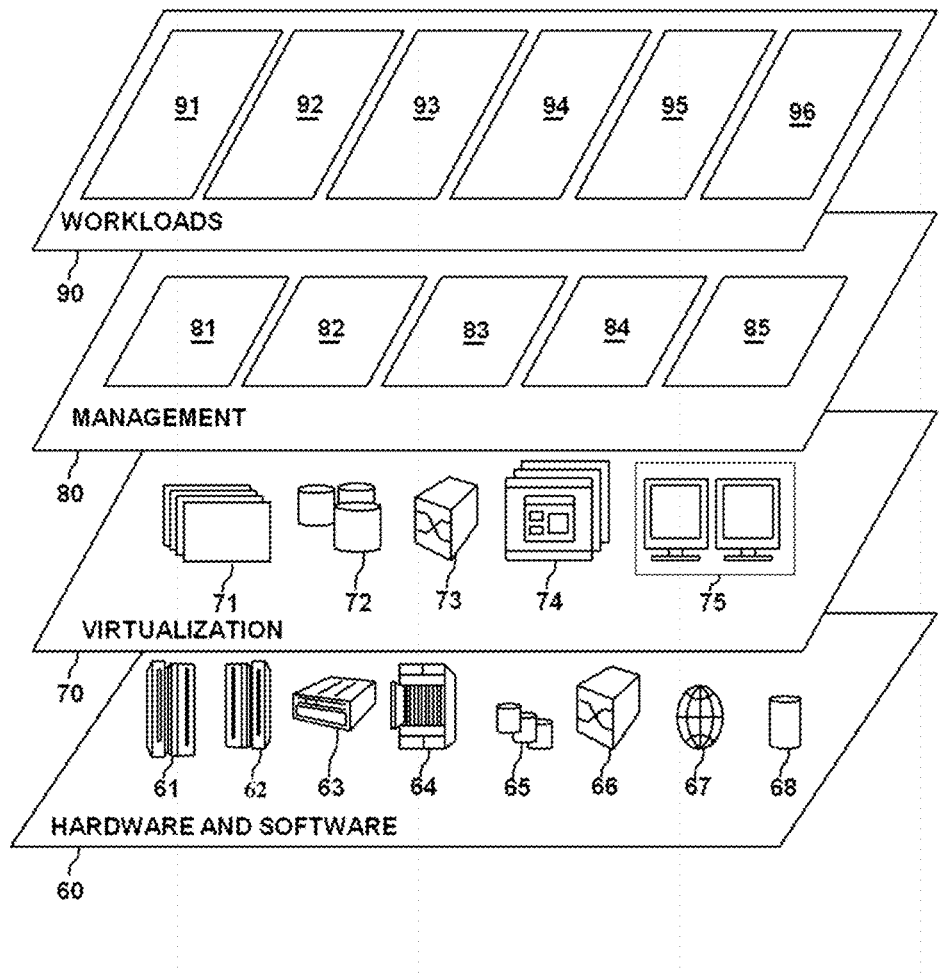
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload scheduling 96.

As described above, there are two ways for a workload scheduling system to release resources of a preempted workload: by terminating and re-queuing or re-running the workload, or by stopping the workload and resuming it later. Terminating a workload means the system will completely kill the process of the workload. Before killing the process, the system may save the state of the process so that when the process is later re-scheduled to run, it can start from the last saved point. The killed workload may be placed back in a scheduling queue or be moved to another host, and may be re-run from the very beginning or from the last saved point. This first way of resource releasing is suitable for a workload having no dependency on the running environment or just running for a short time. Otherwise, it will lead to a waste of the resources. In fact, for a workload having dependency on the running environment or running for a long time, it would be more efficient to use the second way of resource releasing, i.e., to release resources of the workload by stopping (or pausing, or suspending) the workload and resuming it later.

However, the second way of resource releasing works better for some kinds of resources than for the other. For example, when a workload running on a host is stopped, the CPU cycles are available for use by a preemptive workload instantly. However, the memory reserved by the workload cannot be reclaimed instantly and efficiently, because the memory relies on swapping out by operating system (OS) of the host to be released slowly. Frequent OS swapping deteriorates system performance, and sometimes even causes failure of the preemptive workload.

Furthermore, in the stopping-and-resuming way, a workload may have a portion of its reserved resources not releasable to be used by a preemptive workload. The portion of resources is referred to herein as locked resources. For example, locked memory may be used in large quantities of workloads to improve their efficiency or security, or to reduce the overheads. The locked memory of these workloads will not be swapped out in preemption. For real-time applications, frequent memory swapping out will delay their execution. Thus, it is beneficial to set a portion of the reserved resources as being locked. Examples of real-time applications include, but are not limited to, typical database transactions, and model inference workloads for finance, AI and enterprise customers. For data processing applications with critical data to protect, locked memory can prevent confidential data from being swapping out to storage devices with security risks. For example, most of EDA applications require software licenses to run, and the licenses are expensive and confidential to certain EDA tools. EDA workloads need to protect the checkout records of licenses from being hacked or stolen by other users. Accordingly, memory storing software licenses may be set as being locked and will not be releasable to be used by a preemptive workload. For GPU applications, the major bottleneck is to exchange data between CPUs and GPUs as it involves lots of expensive memory copy operations. One common GPU programming style is to map locked memory to GPU address space to reduce data copying overheads. In addition to locked memory, other kinds of locked resources may be desirable for particular workloads in practice.

When making decisions for preemptive scheduling, a scheduler is unaware of resources usage of currently running workloads. In particular, the scheduler may only know total quantity of reserved resources for each currently running workload, but has no idea of the quantity of locked resources in the reserved resources. Thus, it cannot determine accurately how many resources are releasable or available to a preemptive workload. Conventionally, the scheduler may regard all of the reserved resources of a currently running workload as available. But as some of the reserved resources are actually locked, the scheduler cannot guarantee that the preemptive workload can always have sufficient resources. As a result, the preemptive workload will compete with other currently running workloads on the same host that are not scheduled to be preempted (e.g. they may have higher priorities) for resources. This will sometimes lead to an out-of-resource failure of all the workloads including the preemptive workload and the other currently running workloads on the host.

Therefore, there is a need for a novel preemptive scheduling mechanism based on knowledge of releasable resources of currently running workloads, so that a scheduler can accurately select which ones of the currently running workloads are to be preempted by a pending workload. As sufficient resources can be released from the selected workloads for the pending workload, the pending workload will run efficiently without influencing other running workloads. There is also a need for a novel resource releasing mechanism that can quickly reclaim releasable resources from the preempted workloads so that the releasable resources can be immediately used by the preemptive workload, as compared to slow resource releasing by frequent and inefficient OS swapping.

The disclosure is directed to a computer system and a computer-implemented method for preemptive scheduling based on releasable resources. Releasable resources of preempted workload are considered in scheduling to avoid runtime failure of preemptive workload and to improve resource utilization.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 4:
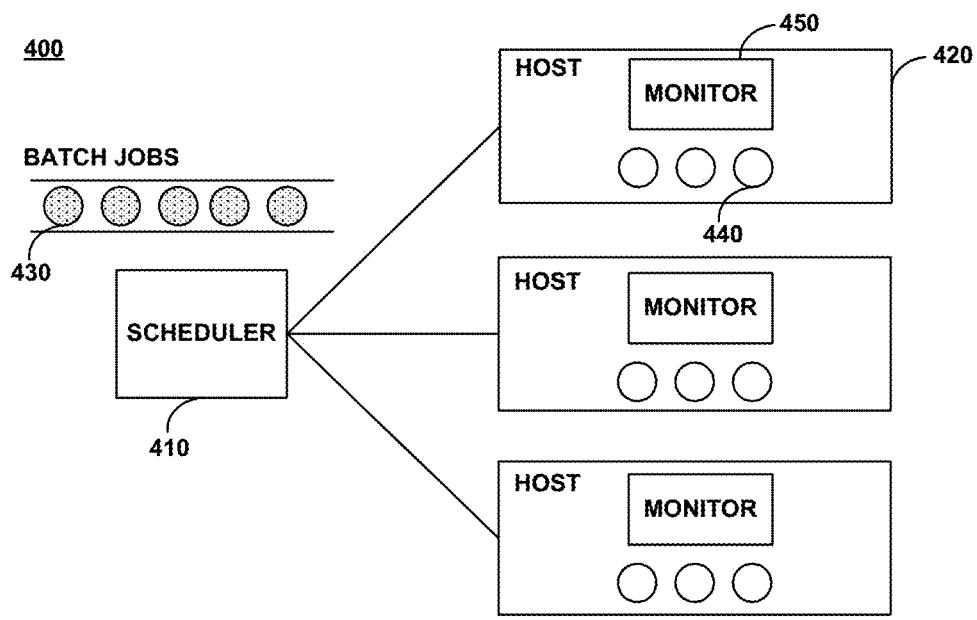
FIG. 4 depicts a simplified workload scheduling system according to an embodiment of the present disclosure.

Embodiments of the present disclosure will be discussed in detail in the below with reference to FIG. 4 which depicts a simplified workload or job scheduling system 400 according to an embodiment of the present disclosure. A scheduler 410 is a machine (or machines) that processes requests for resources from batch jobs and distributes or dispatches the jobs to the host(s) 420 on which the jobs will run. A host 420 is communicatively coupled to the scheduler 410. A host 420 may be one of various kinds of machines including, but not limited to, computer workstations, servers, clients, etc. A plurality of hosts in the system may be the same with or different from each other and may be local to or remote from each other. A host 420 is capable of receiving jobs distributed to it, providing resources for the jobs to run with, and executing the executing. Resources for a job include but not limited to computing capabilities, memory and storage units and communication capabilities. Although not shown in FIG. 4, the hosts can be communicatively coupled to each other so that jobs and control information can be transferred from one to another. A scheduler may be a specialized machine different from the hosts, or may be a common host with a special program for job scheduling.

The scheduler 410 may maintain a scheduling queue to receive batch jobs. Batch jobs get scheduled to run in an order according to various known principles such as first-in-first-out (FIFO), highest priority first or shortest execution time first. Each pending job 430 in the scheduling queue has a resource requirement indicating how many resources it will need. For a job 440 currently running on the host 420, the scheduler may acquire information about how many resources are releasable from the job. The information may be obtained directly by the scheduler, or optionally, be collected and transmitted to the scheduler by a monitor 450 in the host 420. The monitor 450 may be a special module in operating system (not shown) of the host 420 for monitoring resource usage of currently running jobs on the host. The monitor 450 may know how many resources in total are reserved for a job, the percentage or quantity of locked resources in the total resources, and/or the percentage or quantity of releasable resources in the total resources. Based on the resource requirement of a pending job 430 and information about releasable resources from the currently running jobs 440, the scheduler 410 can determine accurately which ones of the currently running jobs 440 are to be stopped and to release resources for the pending job 430. In some embodiments, both the pending job 430 and the currently running jobs 440 are designated with respective priorities. The scheduler 410 may further take the priorities of the jobs into consideration in making preemption decisions.

Figure 5:
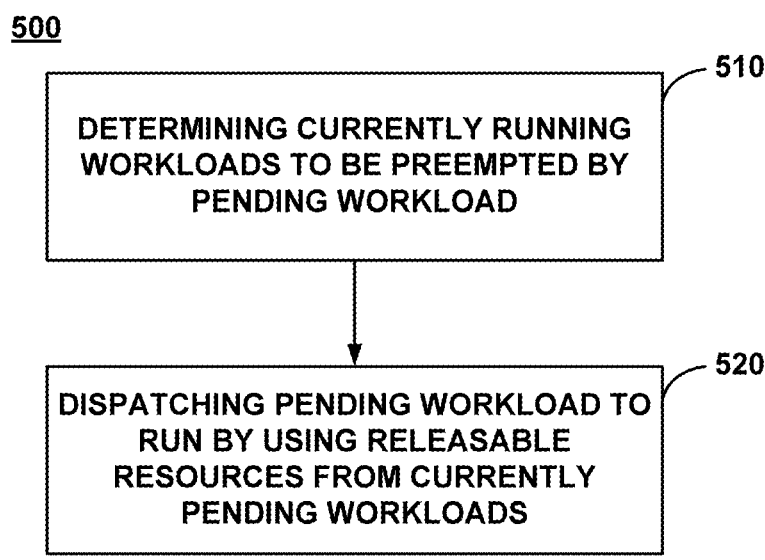
FIG. 5 depicts a flowchart of a releasable resource-based preemptive scheduling method according to an embodiment of the present disclosure.

FIG. 5 depicts a flowchart of a releasable resource-based preemptive scheduling method according to an embodiment of the present disclosure. At step 510, one or more currently running workloads are determined to be preempted by a pending workload, wherein releasable resources from the one or more currently running workloads meet demanded resource of the pending workload.

As described above, step 510 may be performed at a scheduler. A pending workload (denoted by job i) may be received by the scheduling system in a scheduling queue at the scheduler. Along with the pending workload, resource requirement information about the pending workload is also received or obtained. The resource requirement information indicates the quantity of required resources of the workload (denoted by $Rsv_i$).

A plurality of workloads is currently running on one or more hosts in the scheduling system. For a host x, the workloads currently running thereon are indicated as job x1, job x2, . . . , job xm, where m represents the number of workloads currently running on host x. For a currently running workload job xj ($1 \leq j \leq m$), a total quantity of resources on host x or provided by host x is allocated (or reserved, or dedicated) to the workload. The total quantity of resources may be the larger one of the quantity of required resources by job xj from host x (denoted by $Rsv_1$) and the quantity of resources that have actually been reserved by host x to job xj (denoted by $RSS_j$). With an insight into the total quantity of resources, it is noted that some resources will be locked (the quantity of which is denoted by $Locked_j$) even after job xj is preempted by job i. Therefore, the maximum quantity of releasable resources from job xj (denoted by $Rls_j$) may be calculated by subtracting the quantity of locked resources of job xj from the quantity of total resources allocated to job xj, which can be represented in the following equation.

$$Rls_j = MAX(Rsv_j, RSS_j) - Locked_j. \qquad \text{Equation 1:}$$

In some cases, each running workload may further have a constant quantity of resources (denoted by Buf) reserved for recovery. This portion of resources is not releasable either. Thus Equation 1 may sometimes have a variation as follows.

$$Rls_j = MAX(Rsv_j, RSS_j) - Locked_j - Buf. \qquad \text{Equation 1(a):}$$

Based on the required resources $Rsv_i$ of job i and the releasable resources $Rls_j$ from each job xj, one or more currently running jobs (denoted by job xk ($1 \leq k \leq n$) to be preempted by job i are selected from job x1, job x2, . . . , job xm such that a sum of the quantities of releasable resources from job x1, job x2, . . . , job xn can satisfy the required resources of job i. As can be learned from Equation 1, the releasable sources from the one or more currently running jobs are calculated by subtracting locked resources of the one or more currently running workloads from total resources allocated to the one or more currently running workloads. Locked resources of the one or more currently running workloads may already include the constant quantities of resources of all of the one or more currently running workloads. In some cases, host x may already have some idle resources thereon (denoted by $Avail_x$) that can be directly allocated to a job dispatched to it. Thus, the one or more currently pending jobs to be preempted by job i are determined according to the following equation.

$$Avail_x < Rsv_i \leq Avail_x + \sum_{k=1}^{n} Rls_{xk}. \qquad \text{Equation 2:}$$

In some embodiments, the preemptive scheduling method based on releasable resources of currently running workloads to be preempted may be implemented in further consideration of priorities of the currently running workloads and the pending workload. Specifically, the one or more currently running workloads to be preempted may have lower priorities than that of the preemptive pending workload. Still referring to the case that job x1, job x2, . . . , job xn are determined to be preempted by job i, the priorities of job x1, job x2, . . . , job xn (denoted by $Pri_{x1}$, $Pri_{x2}$, . . . , $Pri_{xn}$) may be lower than the priority of job i (denoted by $Pri_i$), which is represented in the following equation.

$$Pri_i > MAX(Pri_{x1}, Pri_{x2}, \ldots, Pri_{xn}). \qquad \text{Equation 3:}$$

Priorities of the currently running workloads and the pending workload may be predetermined or may be calculated and adjusted at runtime. Priorities of a workload may be based on various criteria well known or to be developed yet, which include but are not limited to, urgency or importance of the workload, whether the workload need to be carried out in real-time, dependency of the workload on the running environment, or even time estimated for finishing the workload, etc. For example, a more important workload may be designated with a higher priority than another less important workload. As another example, a workload that has shortest execution time may be designated with the highest priority.

In some embodiments, the one or more currently running workloads determined to be preempted by the pending workload reside on a same host. In a scheduling system comprising a plurality of hosts, the scheduler will traverse each of the plurality of hosts until a host with one or more currently running workloads determined at step 510 is found.

At step 520, the pending workload is dispatched so that it may use at least part of the releasable resources from the one or more currently running workloads to run.

Figure 6:
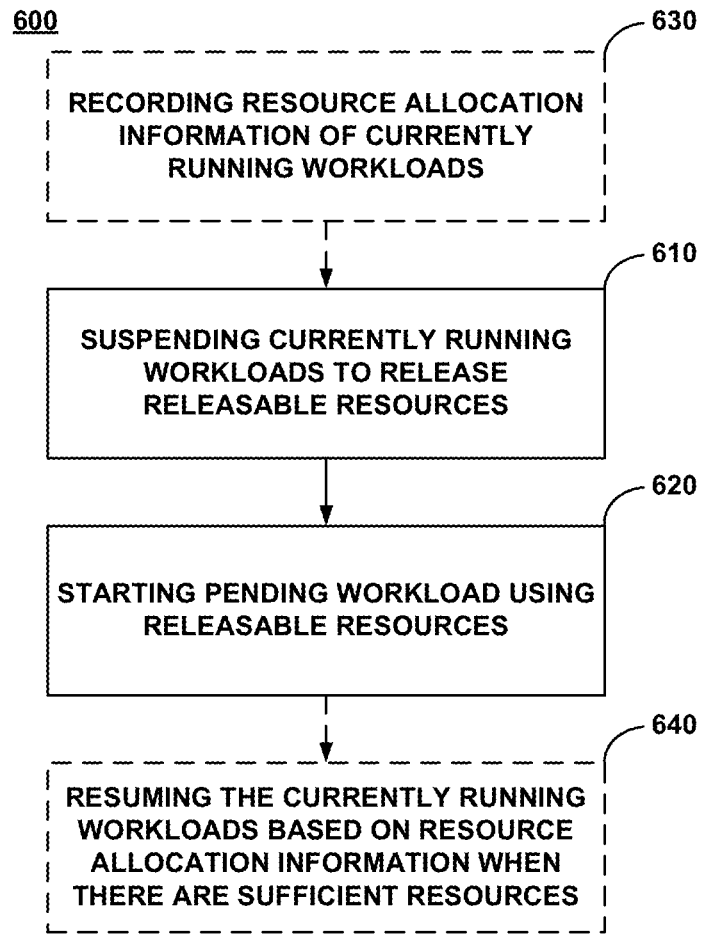
FIG. 6 depicts a flowchart of dispatching a pending workload according to an embodiment of the present disclosure.

FIG. 6 depicts a flowchart of dispatching the pending workload according to an embodiment of the present disclosure. At step 610, the one or more currently running workloads as determined at step 510 are suspended to release the releasable resources. In response to determining, according to step 510, that one or more currently running workloads are appropriate to be preempted by a pending workload, the scheduler may signal the corresponding host or hosts on which the currently running workloads are running to stop processes of the currently running workloads. In such a way, resources previously reserved on the host or hosts for the currently running workloads are released. Next, at step 620, the pending workload is started on the host or hosts using at least part of the released resources. As such, the pending workload can operate normally without influencing other workloads that will still be running on the host or hosts.

In some embodiments, after the step of dispatching, at least one of the one or more currently running workloads is resumed in response to determining that there are sufficient resources for it. For example, after a period of execution, the host or hosts on which the one or more suspended workloads were previously running is able to provide again enough resources for at least one suspended workload. Then the at least one suspended workload can be resumed on the host or hosts. As locked resources are still maintained on the host or hosts for the at least one suspended workload, the resuming of the suspended workload can be carried out more efficiently, as compared to the case where a currently running workload is completely killed without any remaining resources.

In some embodiments, resource allocation information of currently running workloads is recorded before the step of dispatching, in particular prior to the step of suspending the currently running workloads (step 630). Based on the resource allocation information, after the step of dispatching, in particular after the step of starting the pending workload, at least one of the preempted workloads is resumed in response to determining that there are sufficient resources for it (step 640). With the use of resource allocation information, it is possible to promptly free up the resources of the preempted workloads and automatically resume the preempted workload on demand.

In some embodiments, as described above with reference to FIG. 4, a host may comprise a monitor in its operating system. The monitor is able to manage resources allocated to a running workload and collect information about the allocated resources. The monitor is also capable of transmitting the collected information to the scheduler. Step 630 and step 640 may be performed at the monitor. In the example where the resource is memory provided by a host, the resource allocation information may comprise memory limit and virtual memory limit. Virtual memory is used as an expansion to memory. Data infrequently used by a workload may be stored in virtual memory and moved to memory when needed.

In Linux operating system, the monitor can be a system resource enforcement mechanism known as the cgroup. Cgroup may provide at least part or all of the functionalities of resource limiting, prioritization, resource accounting, isolation and controlling of workloads. At step 630, cgroup can record memory limit (memory.limit_in_bytes) and swap limit (memory.memsw.limit_in_bytes) for each workload. Swap is a virtual memory space for temporally storing data for a workload in Linux system. As such, data set for a running workload can be divided into two portions, one being stored in the memory, and the other stored in the swap. When the running workload is to be preempted, cgroup may signal the workload to stop its processes. Stopping a workload may comprise adjusting the memory limit and swap limit to swap out memory for the preempted workload so that occupied memory can be freed up quickly. For example, cgroup may enlarge the swap limit and reduce the memory limit. In this way, the data set stored in the memory may be moved to the swap and the memory held by the preempted workload is released. The swap limit may be assigned by cgroup to be unlimited so that the workload may take a full utilization of the available swap. The memory limit may be assigned by cgroup to be a minimum value so that the memory swap-out is triggered. The minimum value can be the size of unreleasable memory of the workload, i.e. locked memory plus the buffer. Then OS of the host on which the workload was running will automatically perform the memory swap-out. At step 640, cgroup can recover the recorded memory limit and swap limit for a suspended workload and resume the workload in response to a determination that there is enough memory for the workload. As such, the swap limit is reduced and the memory limit is enlarged, and the data set moved to the swap is returned to the memory. It can be appreciated that the releasable resource-based preemptive scheduling method is easy to be integrated with existing preemptive scheduling operations on the host by using cgroup.

Although a detailed description is made above on cgroup of Linux system, it should be recognized that a skilled person can use or design other monitors that have similar functions as cgroup in other operating systems for the fulfillment of the present disclosure.

Figure 7:
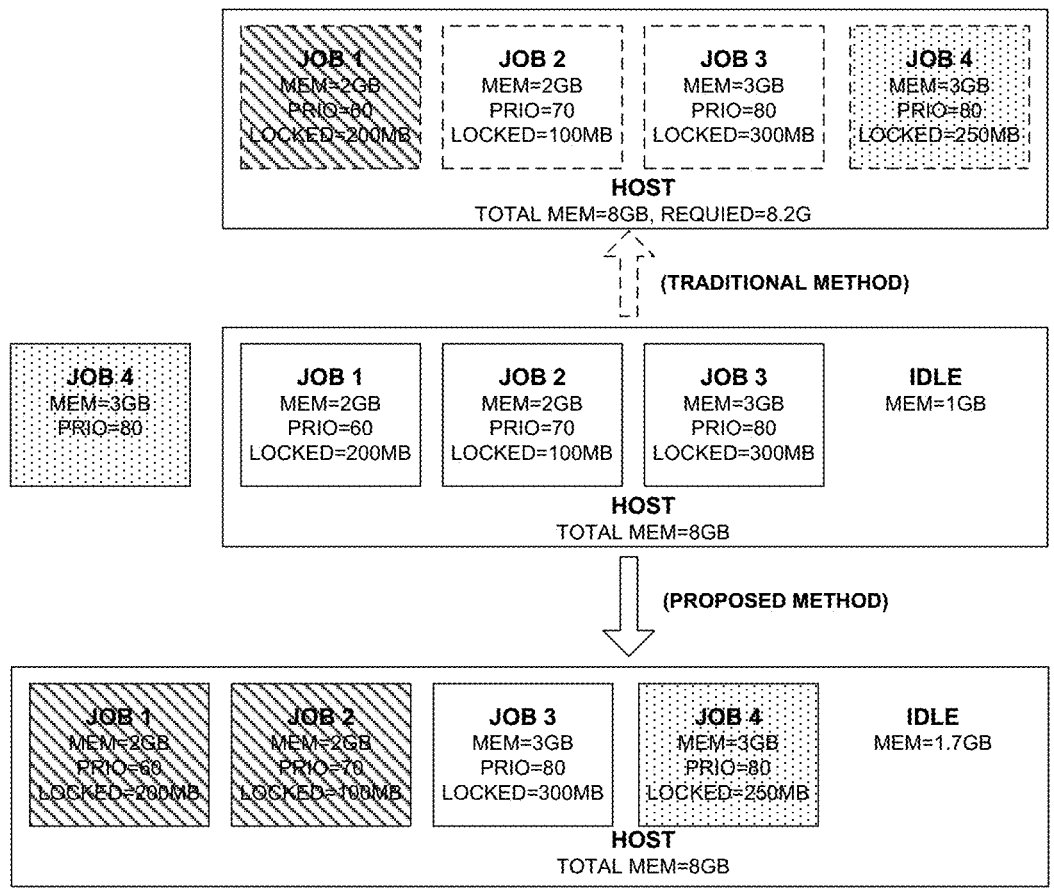
FIG. 7 depicts an example of releasable resource-based preemptive scheduling according to an embodiment of the present disclosure.

FIG. 7 depicts an example of releasable resource-based preemptive scheduling according to an embodiment of the present disclosure. In the example of FIG. 7, the resource for a job is memory. A host may provide a total memory of 8 GB. Job 1, job 2 and job 3 are currently running on the host. The sizes of allocated memory for job 1, job 2 and job 3 are respectively 2 GB, 2 GB and 3 GB, and the locked memory sizes are respectively 200 MB, 100 MB and 300 MB. Thus, the host still has an idle memory of 1 GB. The priorities of job 1, job 2 and job 3 are respectively 60, 70 and 80 (a larger number means a higher priority). Pending job 4 with required memory of 3 GB and a priority of 80 is scheduled to run on the host. Since the host does not have enough idle memory for job 4, job 4 has to take memory from the running jobs on the host.

In a traditional preemptive scheduling method, the system will determine that job 1 is to be suspended to make space for job 4, because job 1 has a priority lower than job 4 and a sum of allocated memory of job 1 (2 GB) plus idle memory (1 GB) can satisfy the required memory of job 4 (3 GB). However, as job 1 has a locked memory of 200 MB that is not releasable, the releasable memory from job 1 (1.8G) cannot meet the require memory of job 4. At runtime, job 4 will compete with job 2 and job 3 for memory, which degrades the performance of all the jobs on the host. If the memory occupied by job 1 cannot be swapped out efficiently, there can be a time that all of job 2, job 3 and job 4 will fail due to out-of-memory condition.

According to an embodiment of the present disclosure, the system will determine that both job 1 and job 2 are to be preempted, because the priorities of job 1 and job 2 are lower than that of job 4, and a sum of releasable memory of job 1 (1.8 GB) plus releasable memory of job 2 (1.9 GB) plus idle memory (1 GB) can satisfy the required memory of job 4 (3 GB). By suspending both job 1 and job 2, job 4 is dispatched to run on the host without any impact on remaining job 3. The host still has an idle memory of 1.7 GB. Another pending job that has required memory less than 1.7 GB can be directly arranged to run on the host. Thus, utilization of memory on the host is improved.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

The present disclosure may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a computer system. The computer system comprises a processor and a computer-readable memory coupled to the processor. The memory comprises instructions that when executed by the processor perform action of determining one or more currently running workloads to be preempted by a pending workload. Releasable resources from the one or more currently running workloads meet demanded resources of the pending workload. The memory comprises instructions that when executed by the processor further perform action of dispatching the pending workload so that the pending workload uses at least part of the releasable resources from the one or more currently running workloads to run.

According to an embodiment of the computer system, the one or more currently running workloads have lower priorities than that of the pending workload.

According to an embodiment of the computer system, the releasable resources from the one or more currently running workloads are calculated by subtracting locked resources of the one or more currently running workloads from total resources allocated to the one or more currently running workloads.

According to an embodiment of the computer system, the action of dispatching the pending workload further comprises suspending the one or more currently running workloads to release the releasable resources and starting the pending workload using the releasable resources.

According to an embodiment of the computer system, the memory further comprising instructions that when executed by the processor perform an action of resuming, after the action of dispatching, at least one of the one or more currently running workloads in response to determining that there are sufficient resources for the at least one workload.

According to an embodiment of the computer system, the memory further comprising instructions that when executed by the processor perform actions of recording, before the action of dispatching, resource allocation information of at least one of the one or more currently running workloads, and resuming, after the action of dispatching, the at least one currently running workload based on the resource allocation information in response to determining that there are sufficient resources for the at least one currently running workload.

According to an embodiment of the computer system, the resource allocation information comprises memory limit and virtual memory limit.

According to an embodiment of the computer system, the one or more currently running workloads are on a same host.

According to an embodiment of the present disclosure, there is provided a computer program product. The computer program product comprises a computer readable storage medium having program instructions embodied therewith. The program instructions are executable by a processor to cause the processor to determine one or more currently running workloads to be preempted by a pending workload. Releasable resources from the one or more currently running workloads meet demanded resources of the pending workload. The program instructions are executable by a processor to further cause the processor to dispatch the pending workload so that the pending workload uses at least part of the releasable resources from the one or more currently running workloads to run.

According to an embodiment of the computer program product, the one or more currently running workloads have lower priorities than that of the pending workload.

According to an embodiment of the computer program product, the releasable resources from the one or more currently running workloads are calculated by subtracting locked resources of the one or more currently running workloads from total resources allocated to the one or more currently running workloads.

According to an embodiment of the computer program product, the program instructions executable by the processor to cause the processor to dispatch the pending workload further causes the processor to suspend the one or more currently running workloads to release the releasable resources and start the pending workload using the releasable resources.

According to an embodiment of the computer program product, the program instructions executable by the processor to further causes the processor to resume, after the action of dispatching, at least one of the one or more currently running workloads in response to determining that there are sufficient resources for the at least one workload.

According to an embodiment of the computer program product, the program instructions executable by the processor to further causes the processor to record, before the action of dispatching, resource allocation information of at least one of the one or more currently running workloads, and resume, after the action of dispatching, the at least one currently running workload based on the resource allocation information in response to determining that there are sufficient resources for the at least one currently running workload.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by one or more processing units, one or more currently running workloads to be preempted by a pending workload, wherein releasable resources from the one or more currently running workloads meet required resources of the pending workload; wherein the releasable resources are a first portion of allocated resources allocated to the one or more currently running workloads, and wherein a second portion of the allocated resources includes an amount of locked resources, wherein the locked resources are resources that cannot be released to the pending workload; and
    dispatching, by one or more processing units, the pending workload so that the pending workload uses at least part of the releasable resources from the one or more currently running workloads to run;
    suspending, by one or more processing units, the one or more currently running workloads to release the releasable resources; and
    starting, by one or more processing units, the pending workload using the releasable resources;
    wherein the one or more currently running workloads have lower priorities than that of the pending workload;
    wherein the releasable resources from the one or more currently running workloads are calculated by subtracting locked resources of the one or more currently running workloads from total resources allocated to the one or more currently running workloads.

2. The method of claim 1, further comprising: resuming, by one or more processing units, after the action of dispatching, at least one of the one or more currently running workloads in response to determining that there are sufficient resources for the at least one workload.

3. The method of claim 1, further comprising: recording, by one or more processing units, before the action of dispatching, resource allocation information of at least one of the one or more currently running workloads; and resuming, by one or more processing units, after the action of dispatching, the at least one currently running workload based on the resource allocation information in response to determining that there are sufficient resources for the at least one currently running workload.

4. The method of claim 3, wherein the resource allocation information comprises memory limit and virtual memory limit.

5. The method of claim 1, wherein the one or more currently running workloads are on a same host.

6. A computer system comprising:

a processor; and a computer-readable memory coupled to the processor, the memory comprising instructions that when executed by the processor perform actions of:

determining one or more currently running workloads to be preempted by a pending workload, wherein releasable resources from the one or more currently running workloads meet demanded resources of the pending workload; wherein the releasable resources are a first portion of allocated resources allocated to the one or more currently running workloads, and wherein a second portion of the allocated resources includes an amount of locked resources, wherein the locked resources are resources that cannot be released to the pending workload; and dispatching the pending workload so that the pending workload uses at least part of the releasable resources from the one or more currently running workloads to run;

suspending the one or more currently running workloads to release the releasable resources; and starting the pending workload using the releasable resources;

wherein the one or more currently running workloads have lower priorities than that of the pending workload;

wherein the releasable resources from the one or more currently running workloads are calculated by subtracting locked resources of the one or more currently running workloads from total resources allocated to the one or more currently running workloads.

7. The computer system of claim 6, the memory further comprising instructions that when executed by the processor perform an action of: resuming, after the action of dispatching, at least one of the one or more currently running workloads in response to determining that there are sufficient resources for the at least one workload.

8. The computer system of claim 6, the memory further comprising instructions that when executed by the processor perform actions of: recording, before the action of dispatching, resource allocation information of at least one of the one or more currently running workloads; and resuming, after the action of dispatching, the at least one currently running workload based on the resource allocation information in response to determining that there are sufficient resources for the at least one currently running workload.

9. A computer program product, comprising a computer readable storage medium having program instructions embodied therewith, the program instructions executable by a processor to cause the processor to:

determine one or more currently running workloads to be preempted by a pending workload, wherein releasable resources from the one or more currently running workloads meet demanded resources of the pending workload; wherein the releasable resources are a first portion of allocated resources allocated to the one or more currently running workloads, and wherein a second portion of the allocated resources includes an amount of locked resources, wherein the locked resources are resources that cannot be released to the pending workload; and dispatch the pending workload so that the pending workload uses at least part of the releasable resources from the one or more currently running workloads to run suspend the one or more currently running workloads to release the releasable resources; and start the pending workload using the releaseable resources;

wherein the one or more currently running workloads have lower priorities than that of the pending workload; and wherein the releaseable resource from the one or more currently running workloads are calculated by subtracting locked resources of the one or more currently running workloads from total resources allocated to the one or more currently running workloads.

10. The computer program product of claim 9, the program instructions executable by the processor to further causes the processor to:

resume, after the action of dispatching, at least one of the one or more currently running workloads in response to determining that there are sufficient resources for the at least one workload.

11. The computer program product of claim 9, the program instructions executable by the processor to further causes the processor to:

record, before the action of dispatching, resource allocation information of at least one of the one or more currently running workloads; and resume, after the action of dispatching, the at least one currently running workload based on the resource allocation information in response to determining that there are sufficient resources for the at least one currently running workload.

* * * * *